(12) United States Patent
Bonanno et al.

(10) Patent No.: US 9,619,385 B2
(45) Date of Patent: *Apr. 11, 2017

(54) SINGLE THREAD CACHE MISS RATE ESTIMATION

(71) Applicant: International Business Machines Corporation, Armonk, NY (US)

(72) Inventors: James J. Bonanno, Wappingers Falls, NY (US); Alper Buyuktosunoglu, White Plains, NY (US); Brian W. Curran, Saugerties, NY (US); Willm Hinrichs, Holzgerlingen (DE); Christian Jacobi, Poughkeepsie, NY (US); Brian R. Prasky, Campbell Hall, NY (US); Martin Recktenwald, Schonaich (DE); Anthony Saporito, Highland, NY (US); Vijayalakshmi Srinivasan, New York, NY (US); John-David Wellman, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 225 days.

This patent is subject to a terminal disclaimer.

(21) Appl. No.: 14/630,680

(22) Filed: Feb. 25, 2015

(65) Prior Publication Data

US 2016/0246722 A1 Aug. 25, 2016

(51) Int. Cl.
*G06F 12/08* (2016.01)
*G06F 12/12* (2016.01)
(Continued)

(52) U.S. Cl.
CPC ........ *G06F 12/0831* (2013.01); *G06F 12/084* (2013.01); *G06F 12/0824* (2013.01);
(Continued)

(58) Field of Classification Search
CPC ......... G06F 2212/314; G06F 2212/621; G06F 2212/622; G06F 2212/684; G06F 2212/69;
(Continued)

(56) References Cited

U.S. PATENT DOCUMENTS 5,574,871 A 11/1996 Hoyt et al.
7,082,520 B2 7/2006 Bonanno et al.
(Continued)

OTHER PUBLICATIONS

Bonanno et al., "Single-Thread Cache Miss Rate Estimation", U.S. Appl. No. 14/918,780, filed Oct. 21, 2015.
(Continued)

*Primary Examiner* — Arpan P. Savla
*Assistant Examiner* — William E Baughman
(74) *Attorney, Agent, or Firm* — Laura E. Gisler

(57) ABSTRACT

Cache miss rates for threads operating in a simultaneous multi-threading computer processing environment can be estimated. The single thread rates can be estimated by monitoring a shared directory for cache misses for a first thread. Memory access requests can be routed to metering cache directories associated with the particular thread. Single thread misses to the shared directory and single thread misses to the associated metering cache directory are monitored and a performance indication is determined by comparing the cache misses with the thread misses. The directory in the associated metering cache is rotated, and a second sharing performance indication is determined.

13 Claims, 9 Drawing Sheets

(51) Int. Cl.
*G06F 12/0831* (2016.01)
*G06F 12/0817* (2016.01)
*G06F 12/084* (2016.01)
*G06F 12/128* (2016.01)

(52) U.S. Cl.
CPC ........ *G06F 12/0828* (2013.01); *G06F 12/128* (2013.01); *G06F 2212/314* (2013.01); *G06F 2212/621* (2013.01); *G06F 2212/622* (2013.01); *G06F 2212/684* (2013.01); *G06F 2212/69* (2013.01)

(58) Field of Classification Search
CPC ............. G06F 12/0831; G06F 12/0824; G06F 12/0828; G06F 12/084; G06F 12/128
See application file for complete search history.

(56) References Cited

U.S. PATENT DOCUMENTS

| | | | |
|---|---|---|---|
| 7,689,773 | B2 | 3/2010 | Fedorova |
| 7,818,747 | B1 | 10/2010 | Fedorova et al. |
| 8,332,586 | B2 | 12/2012 | Takada et al. |
| 8,429,665 | B2 | 4/2013 | Zaroo et al. |
| 8,650,554 | B2 | 2/2014 | Elnozahy et al. |
| 2013/0332716 | A1 | 12/2013 | Bonanno et al. |
| 2013/0339693 | A1 | 12/2013 | Bonanno et al. |
| 2013/0339694 | A1 | 12/2013 | Bonanno et al. |
| 2013/0339695 | A1 | 12/2013 | Bonanno et al. |

OTHER PUBLICATIONS

List of IBM Patents or Patent Applications Treated as Related, dated Oct. 19, 2015, pp. 1-2.
Chandra et al., "Predicting Inter-Thread Cache Contention on a Chip Multi-Processor Architecture," 11th International Symposium on High-Performance Computer Architecture, Feb. 12-16, 2005, pp. 340-351, © 2005 IEEE DOI: 10.1109/HPCA.2005.27.
Eyerman et al., "Per-Thread Cycle Accounting in SMT Processors," Proceedings of the 14th International Conference on Architectural Support for Programming Languages and Operating Systems, Mar. 7-11, 2009, pp. 133-144, Washington, DC, Copyright 2009 ACM.
Guo et al., "From Chaos to QoS: Case Studies in CMP Resource Management," ACM SIGARCH Computer Architecture News, Mar. 2007, pp. 21-30, vol. 35—Issue 1 DOI: 10.1145/1241601. 1241608.
Hsu et al., "Communist, Utilitarian, and Capitalist Cache Policies on CMPs: Caches as a Shared Resource," Proceedings of the 15th International Conference on Parallel Architectures and Compilation Techniques, Sep. 16-20, 2006, pp. 13-22, Seattle, Washington, Copyright 2006 ACM DOI: 10.1145/1152154.1152161.
Kim et al., "Fair Cache Sharing and Partitioning in a Chip Multiprocessor Architecture," Proceedings of the 13th International Conference on Parallel Architecture and Compilation Techniques, Sep. 29-Oct. 3, 2004, pp. 111-122 DOI: 10.1109/PACT.2004.1342546.
Pinter et al., "Data Sharing Conscious Scheduling for Multithreaded Applications on SMP Machines," Euro-Par 2006 Parallel Processing, Lecture Notes in Computer Science, pp. 265-275, vol. 4128, © Springer-Verlag Berlin Heidelberg 2006.
Zhou et al., "Cache Sharing Management for Performance Fairness in Chip Multiprocessors," 18th International Conference on Parallel Architectures and Compilation Techniques, Sep. 12-16, 2009, pp. 384-393, Raleigh, North Carolina DOI: 10.1109/PACT.2009.40.
Qureshi et al., "Utility-Based Cache Partitioning: A Low-Overhead, High-Performance, Runtime Mechanism to Partition Shared Caches," 39th Annual IEEE/ACM International Symposium on Microarchitecture, Dec. 2006, pp. 423-432 DOI: 10.1109/MICRO. 2006.49.
Lee et al., "Branch Prediction Strategies and Branch Target Buffer Design," Computer (vol. 17, Issue 1), Jan. 1984, pp. 6-22 DOI: 10.1109/MC.1984.1658927.
McFarling, S., "Combining Branch Predictors," WRL Technical Note TN-36, Digital Western Research Laboratory, Jun. 1993.
Bonanno et al., "Two Level Bulk Preload Branch Prediction," IEEE 19th International Symposium on High Performance Computer Architecture, Feb. 23-27, 2013, pp. 71-82 DOI: 10.1109/HPCA. 2013.6522308.
Anonymous, "A Method and System for Computing a Single Thread Performance in a Simultaneous Multithreading Environment," An IP.com Prior Art Database Technical Disclosure, IP.com No. IPCOM000237737D, Electronic Publication : Jul. 8, 2014.

SINGLE THREAD CACHE MISS RATE ESTIMATION

BACKGROUND

The present disclosure relates to estimating computer processing rates, and more specifically, to estimating processing rates in a simultaneous multi-threading environment.

Computer processing is how a computer carries out the instructions of a computer program, often by performing basic arithmetic, logical, control and input/output operations specified by instructions. The fundamental operation of most central processing units (CPUs) is to execute a sequence of stored instructions called a program.

Simultaneous multi-threading (SMT) is used in processor architectures to exploit processor resources and reduce idle times in computer processing, and thus it can improve the overall efficiency of CPUs with hardware multithreading. Multiple independent threads of execution can run simultaneously on shared resources, such as execution units of the processor core, caches, or others.

SUMMARY

Embodiments of the present disclosure may be directed toward a computer implemented method for assessing cache miss rates for threads operating in a simultaneous multi-threading computer processor system with a shared cache and cache directory, with a set of rows that are shared by the threads. The cache miss rates can be assessed by monitoring the first shared cache misses indicated by memory access requests to the shared cache directory. The shared cache misses can be detected from the use of the shared cache directory by the threads. The system can route the memory access requests to the metering cache directories that each contain rows. The system can base the routing on an association between each thread and a corresponding metering cache directory. The system can also monitor first single thread cache misses for the memory access requests and for each thread of the plurality of threads. The monitoring of the first single thread cache misses can be based on memory access requests for the metering cache directories. The system can determine a first sharing performance indication based on the first shared cache misses and the first single thread cache misses. The system can modify metering cache directories by changing the rows, and determining a second sharing performance indication based on second shared cache misses and second single thread cache misses that correspond to the modified rows in the subset of rows.

Embodiments of the present disclosure may be directed toward a system for assessing cache miss rates for threads operating in a simultaneous multi-threading computer processor system, the system comprising a shared cache and a shared cache directory with a set of rows that are shared by threads and a processor configured to monitor first shared cache misses indicated by memory access requests to the shared directory. The monitoring of the first shared cache misses is based upon the use of the shared cache directory by the threads. The processor is further configured to route the memory access requests to metering cache directories that each contain rows, with the routing determined by an association between each thread and a corresponding metering cache directory. The processor is also configured to monitor first single thread cache misses for the memory access requests and for each thread, using memory access requests for the metering cache directories. The processor is also configured to determine a first sharing performance indication based upon the first shared cache misses and the first single thread cache misses, and modify the metering cache directory or directories by changing the rows. The processor is further configured to determine a second sharing performance indication based upon second shared cache misses and second single thread cache misses that correspond to the modified rows.

Embodiments of the present disclosure may be directed toward a computer program product for assessing cache miss rates for a plurality of threads operating in a simultaneous multi-threading computer processor system having at least one shared cache and shared cache directory with a set of rows that are shared by the plurality of threads, the computer program product comprising a computer readable storage medium having program instructions embodied therewith, wherein the computer readable storage medium is not a transitory signal per se, the program instructions executable by a computer processing circuit to cause the circuit to perform a method. The method can comprise monitoring first shared cache misses indicated by memory access requests to the shared cache directory, based on the use of the shared cache directory by the threads. The instruction can cause the circuit to route the memory access requests to the shared cache directory to a plurality of metering cache directories that each contain rows. This routing is based upon an association between each thread and a corresponding metering cache directory. The circuit can monitor, based upon memory access requests for the metering cache directories, first single thread cache misses for the memory access requests for the metering cache directories and for each thread of the plurality of threads; determine a first sharing performance indication based upon the first shared cache misses and the first single thread cache misses; modify at least one of the metering cache directories by changing the rows that are in the subset of rows; and determine a second sharing performance indication based upon second shared cache misses and second single thread cache misses that correspond to the modified rows.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
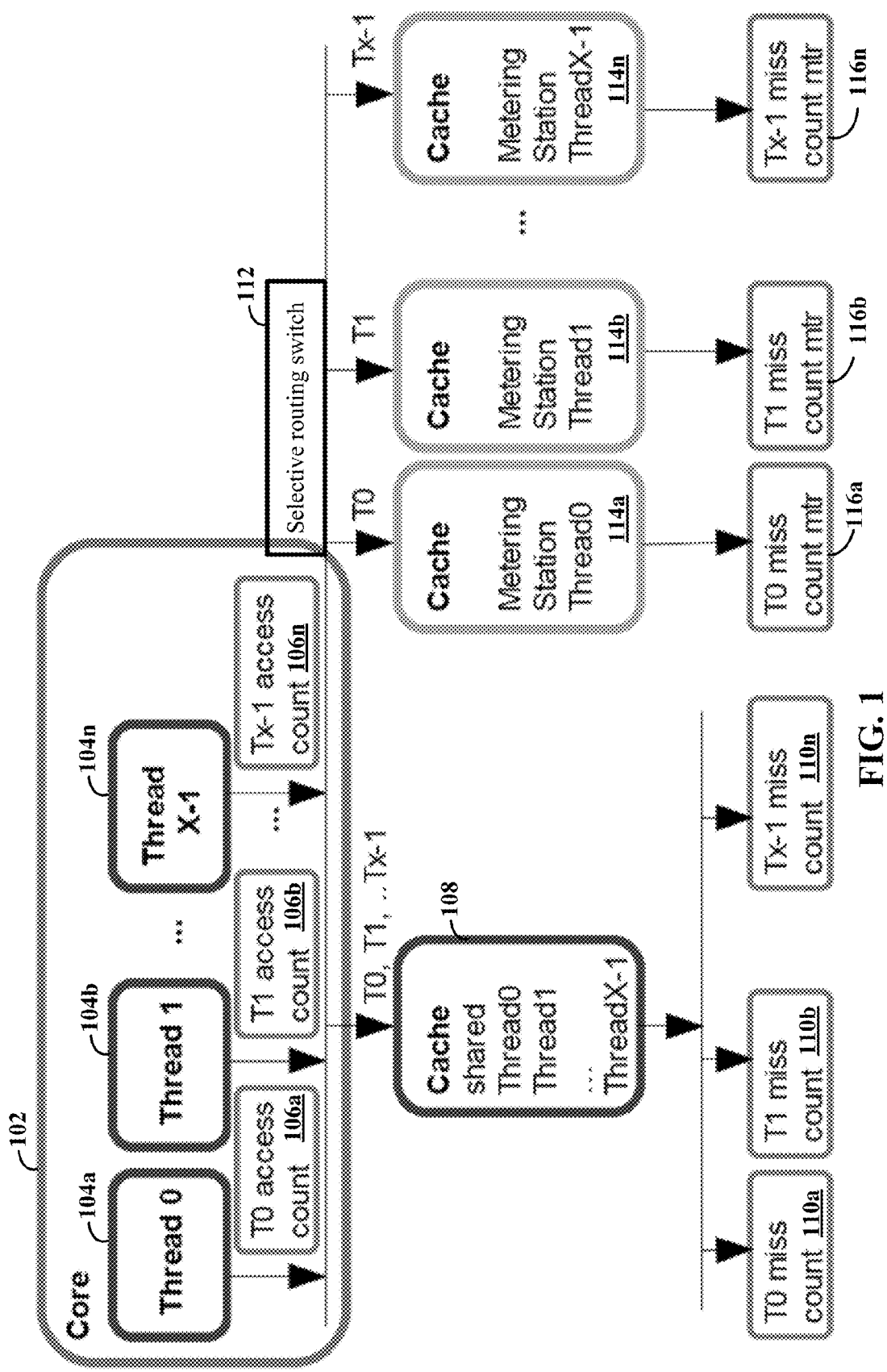
FIG. 1 depicts a system for estimating per-thread cache miss rates on a multi-threaded processor, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the estimation of single-thread cache miss rates, more particular aspects relate to the rotation of portions of cache directories in determining hit and miss rates. While the present disclosure is not necessarily limited to such applications, various aspects of the disclosure may be appreciated through a discussion of various examples using this context.

In computer science, a software thread of execution can be the smallest sequence of programmed instructions that can be managed independently by an operating system scheduler. The implementation of threads and processes differs from one operating system to another, but in most cases, a thread is contained inside a process. Multiple threads can exist within the same process and share resources such as memory, while different processes do not share these resources.

Simultaneous Multithreading (SMT) processors seek to improve core utilization by sharing resources across multiple active threads. SMT can be used on process architecture to run multiple threads simultaneously, sharing resources such as execution units of the processor core, caches, or others. This resource sharing can increase overall system throughput by utilizing processor resources and reducing idle time. It can, however, affect single-thread performance in unpredictable ways, creating differences between a thread's execution time in an SMT environment as opposed to if the thread were executed alone on the processor.

Consistent with embodiments, an SMT environment can impact performance by sharing cache space between multiple threads. Threads can take advantage of shared cache space, with a second thread sharing data that was already loaded to the cache by execution of a first thread. As more threads are added to a core, the variability of any individual thread when running alone vs. running with other threads will increase. The increase can be a result of threads interfering with each other through an increased conflict over shared resources. For example, data of a second thread could replace data from a first thread, resulting in a need to reload the data for the first thread, so the first thread can access the data as necessary. Because of this additional need to reload the data for the first thread, this interference would result in a longer execution time for the second round of the first thread's execution.

Single-thread performance can be determined for each thread running on SMT processors. Single-thread performance can be understood as the speed at which a thread would run if it were running alone, rather than on SMT processors. This performance value can be estimated in order to assist with determinations regarding how a customer may be charged for a hosting service. These performance values can also be used to improve system performance on all levels of the system stack, including hardware, operating system, applications, and others. Measuring single-thread performance in an SMT environment can be known as SMT metering, and it can be calculated as the percentage of time a particular thread was running on SMT processors because other threads were using resources. This measurement can be determined dynamically and the calculation can often relies heavily on the workload.

Single-thread cache miss rates for a cache that is shared by multiple threads can be estimated as though the thread were running alone. A solution to meter a single-thread performance of a cache is to implement a separate cache directory per thread on the side. Each separate directory could track the number of misses that the thread would have had if it were running alone. The number of misses tracked from the thread can then be compared with the number of misses for each thread of the shared SMT cache. This can be done by comparing a rate of a thread running in an SMT processor and a rate of the same thread running in a pseudo-solo processor. This single thread performance value can be very useful. Specifically, a knowledge of resource usage can be used to identify the impact of sharing on each individual thread's performance, in order to allow for metering and chargeback.

Figure 2:
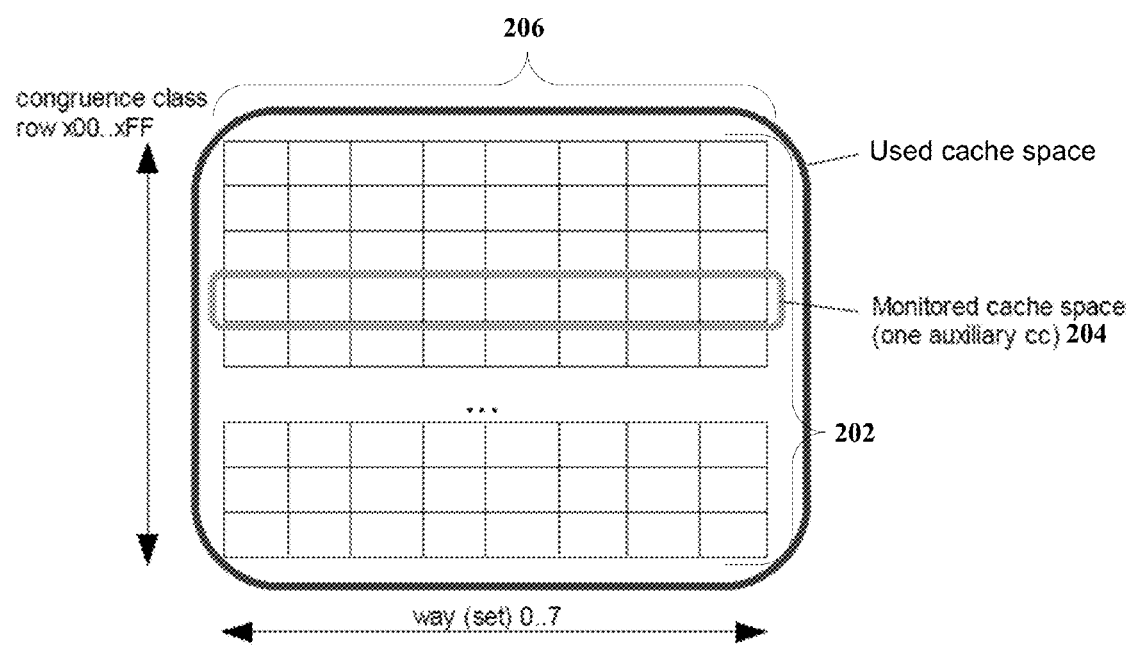
FIG. 2 depicts a diagram of cache space, according to embodiments of the present disclosure.

However, storing a separate cache directory for each thread in order to monitor single-thread performance in an SMT environment can place heavy demands on system resources. Cache memories can be organized in a matrix arrangement where one direction corresponds to congruence classes and the other to equivalent sets within each congruence class. The congruence class partitioning can divide the use of the cache with respect to information type. As such, entries within a given class only can be examined in order to determine memory conflicts or whether a particular value at a given address is present or absent from the cache. For example, each row in cache memory can be a congruence class, and each column a way or set. An example depicting congruence classes as rows is shown in FIG. 2.

In order to decrease the resource demand, the implementation of a separate cache directory for each thread can consist of one congruence class only. With this limitation, the cache can be metered for only one class at a time. The resource demand of the separate cache directory can be reduced to the amount of storage required by address tag information per way (set) and the LRU (least-recently-used) status for one congruence class only.

As the congruence classes are not necessarily accessed equally by applications using the cache, the congruence class being monitored can be chosen randomly and switched on every "N" cycles. This determination may be based on a configurable timing interval "N".

Consistent with embodiments, after each switch, each particular cache directory can be reset to its initial state (cleared of data), and it can be primed with the new congruence class in order to get realistic hit and miss rates from the new congruence class (for which it is being primed).

Each particular cache directory may be configured to meter a specific thread. Thus, each thread may require a particular cache directory to be implemented specifically for the particular thread. The cache directory may also need to be configured to meter that specific thread.

Consistent with the embodiments, an additional cache directory can be implemented, being configured to meter a specific thread for a new congruence class. This cache directory can be primed with the new congruence class for that specific thread. Thus an additional cache directory can be used to ensure that the metering for each thread, as the rotation occurs, can be accurate for the particular congruence class.

Each particular cache directory may be configured to serve as a primer station or as an active station. After each switch, the primer configuration for each directory is rotated. A primer station can become an active station, and the latter active station may become the primer station to meter a new congruence class. Embodiments of this rotation are described in further detail herein.

Consistent with embodiments, an SMT computer processor can monitor a shared cache directory for a plurality of threads for shared cache misses for a first thread of the plurality of threads. These misses can be indicated by memory access requests to the shared cache directory. Each memory access request can be routed in a particular manner to a plurality of metering cache directories, with each directory containing a subset of rows from the set of rows (congruence classes). The routing of each memory access request can be based upon an association between each thread and a corresponding metering cache directory.

Consistent with embodiments, the computer processor can further monitor single thread cache misses for a first thread for the memory access requests that have been routed for each thread of the plurality of threads. Based on these numbers, first sharing performance indications can be determined. These can indicate the difference between the number of misses in the shared cache for each particular thread and the number of misses for the first single thread cache.

Consistent with embodiments, the system can modify at least one of the metering cache directories from the plurality of metering cache directories. This modification can result from the changing of the rows in the subset of rows. Finally, the system can determine, from a second sharing performance indication based upon second shared cache misses and second single thread cache misses that correspond to the modified rows in the subset of rows. In this way, the selected subsets can be rotated, according to calculations described herein, to provide for a more accurate miss rate assessment. This miss rate for an individual (or "single") thread within the SMT environment can then be compared with the access count number, as well as the actual miss rate for threads accessing the shared cache and not being routed to a particular cache, as detailed in FIG. 1 and elsewhere.

Hierarchal branch prediction structures can be fitted to SMT metering logic. Single thread performance can be estimated for branch predictors in a multithreaded environment. This can be accomplished by translating branch prediction and outcome states into Branch Target Buffer (BTB) access, hit, and miss indications that can be reported to SMT metering logic.

Branch prediction is a performance-critical component of a pipelined high frequency microprocessor. It can be used to predict the direction (taken vs. not taken) and the target address of each branch instruction. This can improve processor speed because it can allow processing to continue along a branch's predicted path rather than having to wait for the outcome of the branch to be determined. A penalty is incurred if a branch is mispredicted.

The BTB is a structure that stores branch and target data. A BTB can be used to predict a target of a predicted taken branch instruction based on the address of the branch instruction. Predicting the target of the branch instruction can prevent pipeline stalls by not waiting for the branch instruction to reach the execution stage of the pipeline to compute the branch target address. It is a cache of branch information and in many ways it is analogous to instruction and data cache. BTBs are different than other caches since it can be accessed speculatively before the actual instruction stream is even known. Other structures such as a Branch History Table (BHT), Pattern History Table (PHT), and Multiple target Table (MTT), can be included to store additional information used for branch direction and target prediction. For example, a BHT can predict the direction of a branch (taken vs. not taken) as a function of the branch address. A PHT can assist with direction prediction of a branch as a function of the pattern of branches encountered leading up to the given branch which is to be predicted. For purposes herein, any of these aforementioned structures can be accessed in parallel with the BTB with the same latency as the BTB.

When using BTBs, or other structures functionally similar to those listed above, specifically in an asynchronous lookahead branch prediction, lack of predictions could either be due to no branches being present in the code in a particular address range or due to limited predictor capacity causing desired predictions for branches that do exist to have been evicted and/or replaced. Were each of the previous scenarios to be reported directly to the SMT logic, without any translation, they would each register as a "miss". However, the former "miss" would actually be due to the speculative aspect of branch prediction, rather than the desired impact on single thread processing rates due to the multithread (as opposed to single thread) environment. The latter scenario, which would also be reported as a "miss", is a "true miss", a lack of available data due to limited capacity, which would accurately aid the SMT metering logic in determining the degradation of single-thread processing rates due to a multithread environment.

Asynchronous, lookahead branch prediction can be done asynchronously from a main processor pipeline which begins with instruction fetching. Upon being restarted at a specified instruction address at the same time frame as instruction fetching, branch prediction independently searches the BTB for the first branch at or after the restart address. Upon finding a branch, the branch prediction logic can report it to the instruction fetching logic and to the pipeline logic to allow eventual correlation between branch predictions and instructions being decoded. Independently from the rest of the pipeline, the branch prediction logic can re-index itself with the predicted target address of a predicted taken branch. For a predicted not-taken branch it can continue searching sequentially. The branch prediction logic can look for the next branch. This process can be repeated. Branches that are executed in the pipeline can update the branch prediction structures (such as the BTB). These updates can occur when the branch is complete or they can occur speculatively at points earlier in the pipeline.

A hierarchy of branch predictors can be used. This can be similar to a hierarchical data or instruction cache. However, there can be more flexibility in designing a branch prediction hierarchy because branch prediction is speculative, and it is allowed to be incorrect. Therefore, considerations like cache coherence, strict inclusivity or exclusivity that apply to data or instruction caches are not necessarily as constraining for branch predictors. Semi-exclusive multi-level BTB hierarchy with a preload BTB (BTBP) can act as a filter for bulk transfers from higher cache levels like a second level BTB (BTB2) and a victim buffer of victims from a first level BTB (BTB1).

Consistent with embodiments, SMT metering can estimate the performance degradation experienced by caches shared by threads in a multi-thread environment. The implementation of a separate cache directory for each thread for a single congruence class, and monitored accordingly can be directly applied to hierarchical instruction and data caches which can be accessed for each instruction or operand data fetch. Upon being accessed, it is known whether or not there is a hit or miss in the cache. This information can be directly reported to the SMT metering logic at that time.

However, this approach cannot be applied directly to hierarchical branch predictors, as the branch predictors can be accessed asynchronously from the rest of the processor pipeline, even before instruction boundaries have been determined. Thus, reporting actual branch prediction accesses, hits, and misses to SMT metering logic would be ineffective, because the lack of a branch prediction in a particular buffer can be due to the absence of a branch in the region being searched or it can indeed be an indication of one or more capacity misses if there are indeed branch instructions being searched. Thus, accesses to some levels of the hierarchy are speculative and hits and misses for such accesses are not directly correlated to processor performance. SMT metering techniques can, however, be applied to hierarchical branch predictions by translating the results through reporting accesses, hits, and misses to branch prediction structures as a function of the prediction and resolution status of branches at instruction resolution rather than reporting results of accesses to branch prediction structures at the time they are accessed. In this format, the SMT metering logic can determine the effect of SMT on the cache hit vs. miss rate.

FIG. 1 depicts a system for estimating per-thread cache miss rates on a multi-threaded processor, according to embodiments of the present disclosure. A central processing unit (CPU) of a multi-core processor or core 102 can execute a number of threads 104a-n in parallel, on execution units of the processor core. Single-thread performance of a cache can be metered on a multithread processor by implementing a separate cache directory 114a-n per thread on the side. The separate cache directories can be used to determine the number of misses that the thread would have made if the thread had been running alone. The number of misses for each thread of the side cache directories can be compared to the number of misses for each thread of the shared SMT cache 108. This can be accomplished through selecting and monitoring cache miss rates for one auxiliary congruence class. The classes can be accessed in a particular order, and for a particular number of cycles.

Consistent with embodiments, the number of actual misses per thread in the SMT environment can be determined. For example, each thread 104a-n, can access a shared cache 108 to access needed data which may or may not be stored in the cache 108. Each time a particular thread, exemplar threads depicted thread "0" 104a, thread "1" 104b, to thread "x−1" 104n, accesses the shared cache 108, the access is counted, per blocks 106a-106n, respectively. At any particular access by any particular thread, the data needed by the thread may be available for use in the shared cache 108. The data may also not be available to the particular thread. This latter situation results in a "miss", and can be counted, per blocks 110a-n, for each thread respectively. The number of shared cache accesses for a particular thread, as counted at 106a-n, can be compared with the number of misses for a particular thread, as counted at 110a-110n.

Consistent with embodiments, the number of misses that each particular thread would have had if it were running alone can be determined. As with the determination of actual misses per thread, the single-thread performance can be determined when each thread 104a-n attempts to access a shared cache 108 to access needed data (which may or may not actually be stored in the cache 108 at the time of request). Each time a particular thread, exemplar threads depicted thread "0" 104a, thread "1" 104b, to thread "x−1" 104n, attempts to accesses the shared cache 108, the access is counted, per blocks 106a-106n, respectively. However, unlike the actual count determination, in this situation each thread access attempt is routed through a selective routing switch 112. This routing switch 112 can select, based on the thread number (e.g. 0, 1, . . . x−1, for 104a, 104b . . . 104n, respectively), an appropriate cache to which the thread is associated and can be directed accordingly. Here each cache 114a-114n can contain data needed for the individual thread and accessed by the particular thread. Thus, each cache in the series of caches for each thread can minor aspects of a single-thread environment. A "miss" as described above is counted for each thread at 116a-116n, indicative of a miss to the particular metering cache directory associated with the thread. The counts from 116a-116n can be compared with the thread access counts 106a-n, in order to determine thread performance in a pseudo-single thread environment.

The actual performance for each thread in an SMT environment can be compared with the determined thread performance for each thread in a pseudo-single thread environment. These numbers can be continually determined and calculated. For example, the numbers of the total cache accesses, the number of actual misses in the SMT environment, and the number of misses the thread would have had if running alone can be summed by counters in hardware. The final calculation, the comparison of numbers and determination of a ratio of how "fast" each particular thread was running in the SMT environment relative to running alone can be determined by software.

Consistent with embodiments, the required chip power and area for this process can be decreased by eliminating the need for each metered cache directory to be fully implemented per thread.

FIG. 2 depicts a diagram of cache space, according to embodiments of the present disclosure. A portion of the cells of used cache space 206 is depicted. As described herein, rows of a cache memory matrix can be organized into congruence classes, and columns can be organized into ways or "sets". Congruence class partitioning can divide the use of the cache with respect to information type; thus, entries within a given class can be examined in order to determine memory conflicts or whether a particular value at a given address is present or absent from the cache. One way to avoid the need for each metered cache directory to be fully implemented per thread is to exploit this organization by monitoring cache miss rates for one auxiliary congruence class only. In FIG. 2, each row of cells 202 represents a congruence class. Each column might include a number of ways or "sets" as being represented by the shared cache (i.e. the shared cache 108 of FIG. 1). In this figure, the one particular congruence class to be the monitored cache space 204 has been selected.

Consistent with embodiments, the number of accesses and misses for the shared cache can be determined based on this specific congruence class 204. This can include monitoring the number of cache access matches per thread for the address of the specific congruence class. As described herein, the selected or monitored congruence class 204 can be rotated throughout the processing, in order to improve accuracy of estimation of single-thread cache miss rates.

Figure 3:
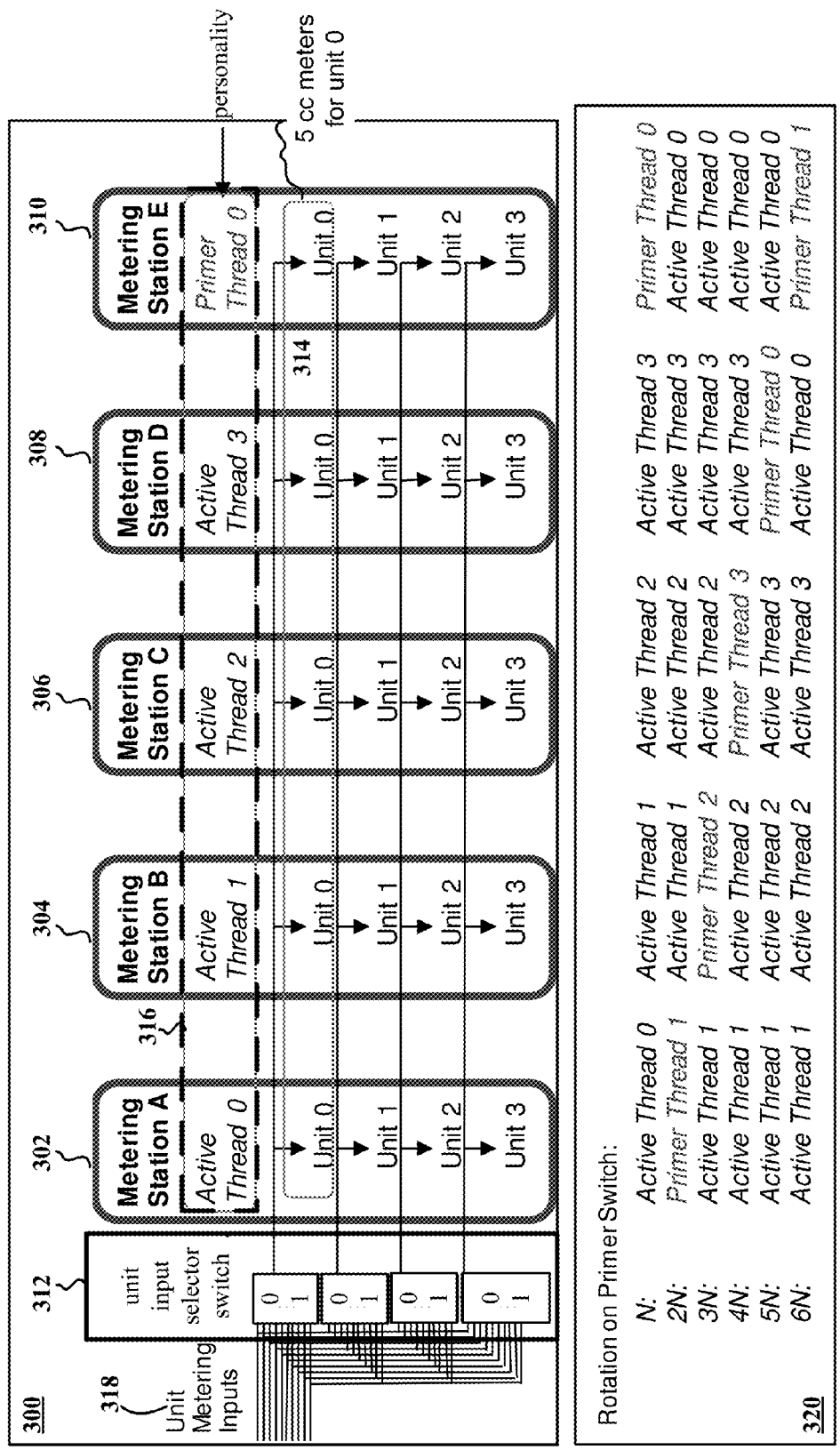
FIG. 3 depicts a diagram of metering stations for assessing cache miss rates for a plurality of threads operating in a simultaneous multi-threading computer processor system, highlighting the rotation of threads and congruence classes, according to embodiments of the present disclosure.

FIG. 3 depicts a diagram of metering stations for assessing cache miss rates for a plurality of threads operating in a simultaneous multi-threading computer processor system, highlighting the rotation of threads and congruence classes, according to embodiments of the present disclosure. The figure can be divided into section 300, which depicts metering stations similarly to their depiction in FIG. 1, and section 320, which corresponds to the visual set up of the metering stations in 300, but details the rotation of the primer and threads across the stations over a configurable timing interval of a determined number of execution cycles N.

In the example depicted at 300, five metering stations 302-310 are used to meter four active threads (threads 0, 1, 2, and 3) and one primer for the thread next in line to rotate to the new station, as detailed herein. In this example, up to four different cache units located on an SMT processor can be metered. Meter logic is depicted as Unit 0-3, with Unit 0 being marked as 314 in this figure. Unit metering inputs 318 of one specific cache unit can be selected by a Unit Input Selector Switch 312, and the selection can be routed to a specific unit, Unit 0-3, for metering. The metering inputs 318 include the identifying information including indication of threads requesting a cache access, along with the congruence class of the access and the address tag of the access.

The labels contained in box 316 indicate the current personality of each metering station, namely which metering station is serving as an active station or as a primer station for specific threads at a particular time. For example, metering station A 302 is currently metering thread 0, metering station B 304 is currently metering thread 1, and so on. One station may serve as a primer station of a specific thread for a new congruence class.

Box 320 shows an example of how the personality of each metering station can be changed on a switch. The primer station for thread x becomes an active station for thread x at the switch. At that same switch, the previously active station for thread x becomes a primer station for thread x+1.

Figure 4:
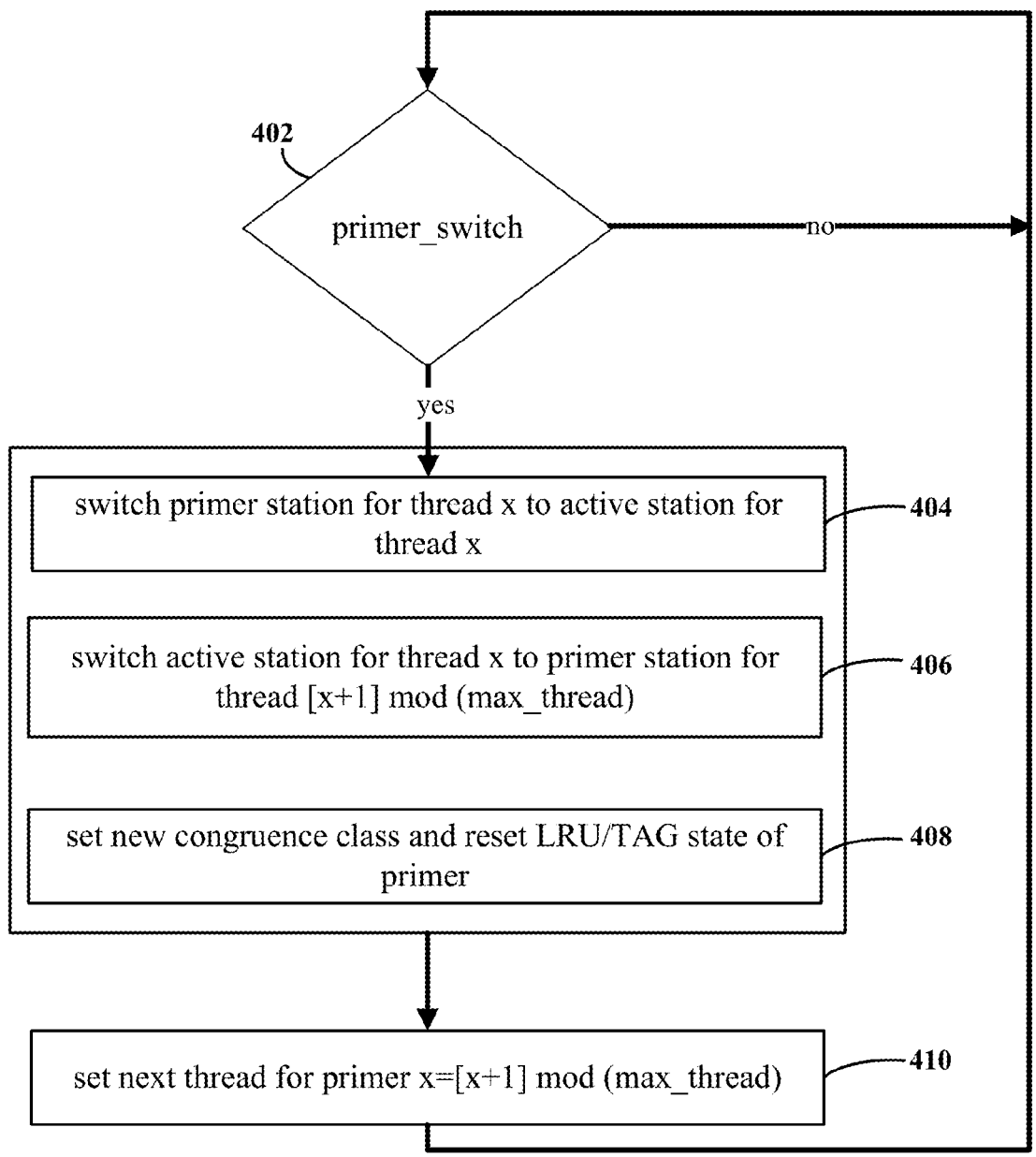
FIG. 4 depicts a flow for the personality changes of metering stations after a primer switch, according to embodiments of the present disclosure.

FIG. 4 depicts a flow for the personality changes of metering stations after a primer switch, according to embodiments of the present disclosure. The flow can correlate with the table 320 of FIG. 3, "Rotation on Primer Switch". The decision box 402 might be represented by a timer, which will trigger a primary switch every "N" cycles. If a primer switch is not being triggered, the system continues to monitor the station with the current personality. Once a primer switch is detected, the station switches the primer metering station for thread x to an active station for thread x, per 404. For example, the system switches personality of the primer station for thread 1 and triggers a switch to an active metering station for thread 1. The system could switch the active station for thread x to the primer station for thread "[x+1] mod (max_thread)", per 406. The modulus (max_thread) serves to ensure the system stays within the parameters set by largest number of threads being monitored. In this example, the former active station for thread 1 could be switched to the primer station for thread 2. Upon the thread change, the system can set a new congruence class and reset the least-recently-used "LRU" and tag state of the primer station, per 408. This results in a new personality for metering stations as being represented by a new row depicted in box 320. In preparation of the next primer switch, the next thread for the next primer station is determined by x=[x+1] mod (max_thread), per 410. For example, a primer station for thread 2 will result in selecting thread 3 for the primer station after a primer switch has been triggered. The process repeats, returning to monitoring for the necessity of a switch and the presence of a primer.

Figure 5:
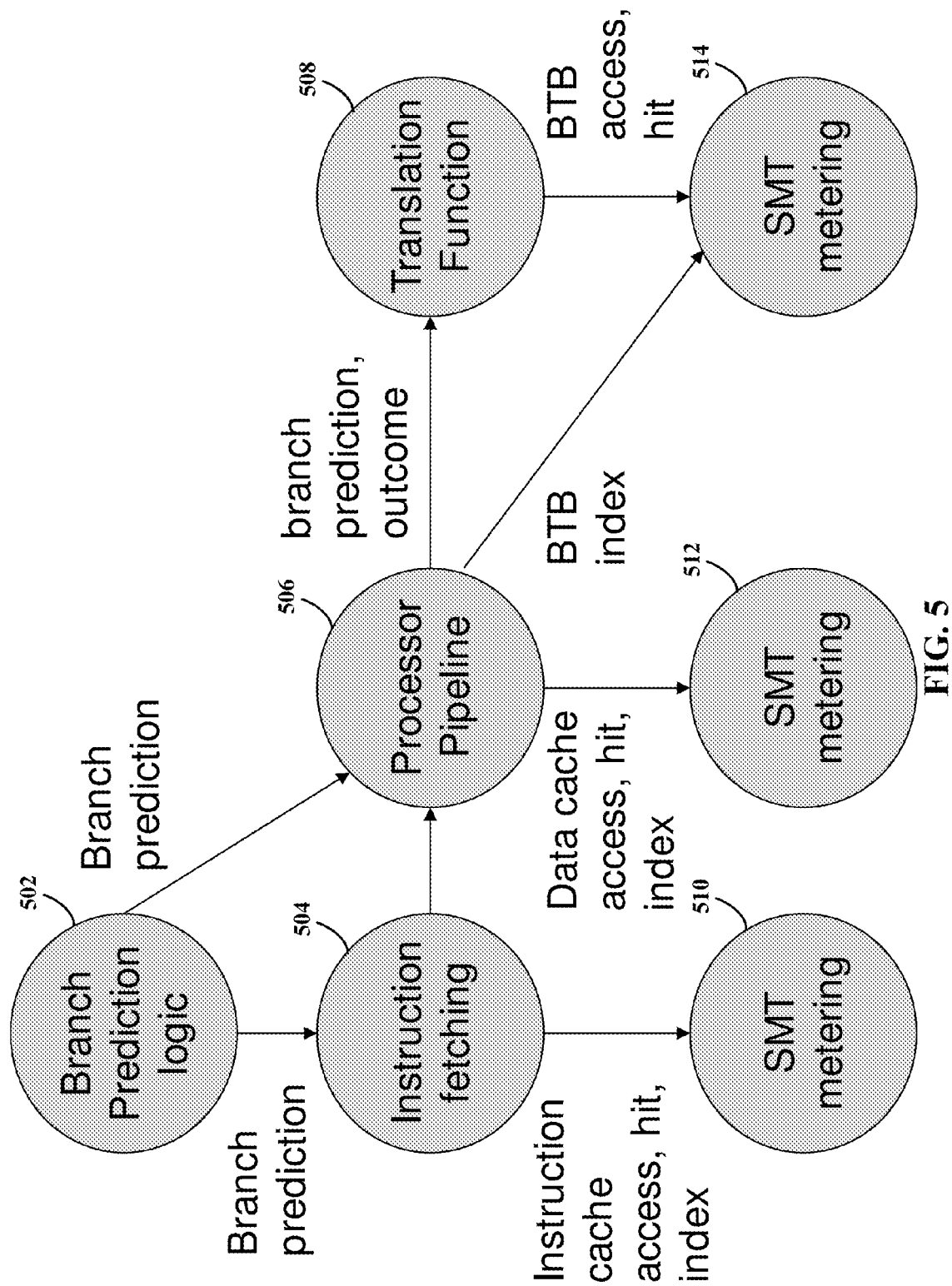
FIG. 5 depicts a flow diagram for branch prediction in an SMT environment, according to embodiments of the present disclosure.

FIG. 5 depicts a flow diagram for branch prediction in an SMT environment, according to embodiments of the present disclosure. Branch prediction can be used within an SMT environment, and branch prediction and outcome information can be translated to predict single-thread performance. The branch prediction process depicted here can be part of a processing system that can include at least one processor circuit.

The branch prediction process shown here can be part of an instruction pipeline. An instruction pipeline in a computer processor improves instruction throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in a pipeline before fetching a next instruction in an instruction fetching stage for the pipeline. According to embodiments of the present disclosure, a system's branch prediction logic 502, can attempt to guess whether a conditional branch will be taken or not. A branch predictor can also include branch target address predictors, which attempts to guess a target of a taken conditional or unconditional branch before it is computed by decoding and executing the instruction itself. The branch prediction logic 502 can send the branch prediction to both the instruction fetching unit 504 and the processor pipeline 506. The instruction fetching unit 504 can fetch instructions based on the predicted branch, from an instruction cache. This access can be counted, and if the instruction is found, a hit can be counted, and the results can be indexed.

At each point in the branch prediction pathway, SMT metering can be performed, as indicated. SMT metering 510 of the instruction cache access, hit, and index, as well as SMT metering 512 of the data cache access, hit, and index can be part of the process, in order to ensure accurate SMT metering outcomes throughout branch prediction. SMT metering 514 on the branch prediction structures after translation is the relevant portion of metering specifically addressed by this disclosure. Before the branch predictions can be metered accurately using existing SMT metering processes, the predictions and outcomes need to be translated via the translation function 508. Further detail of the translation function is provided in the table herein and elsewhere within this disclosure.

Figure 6:
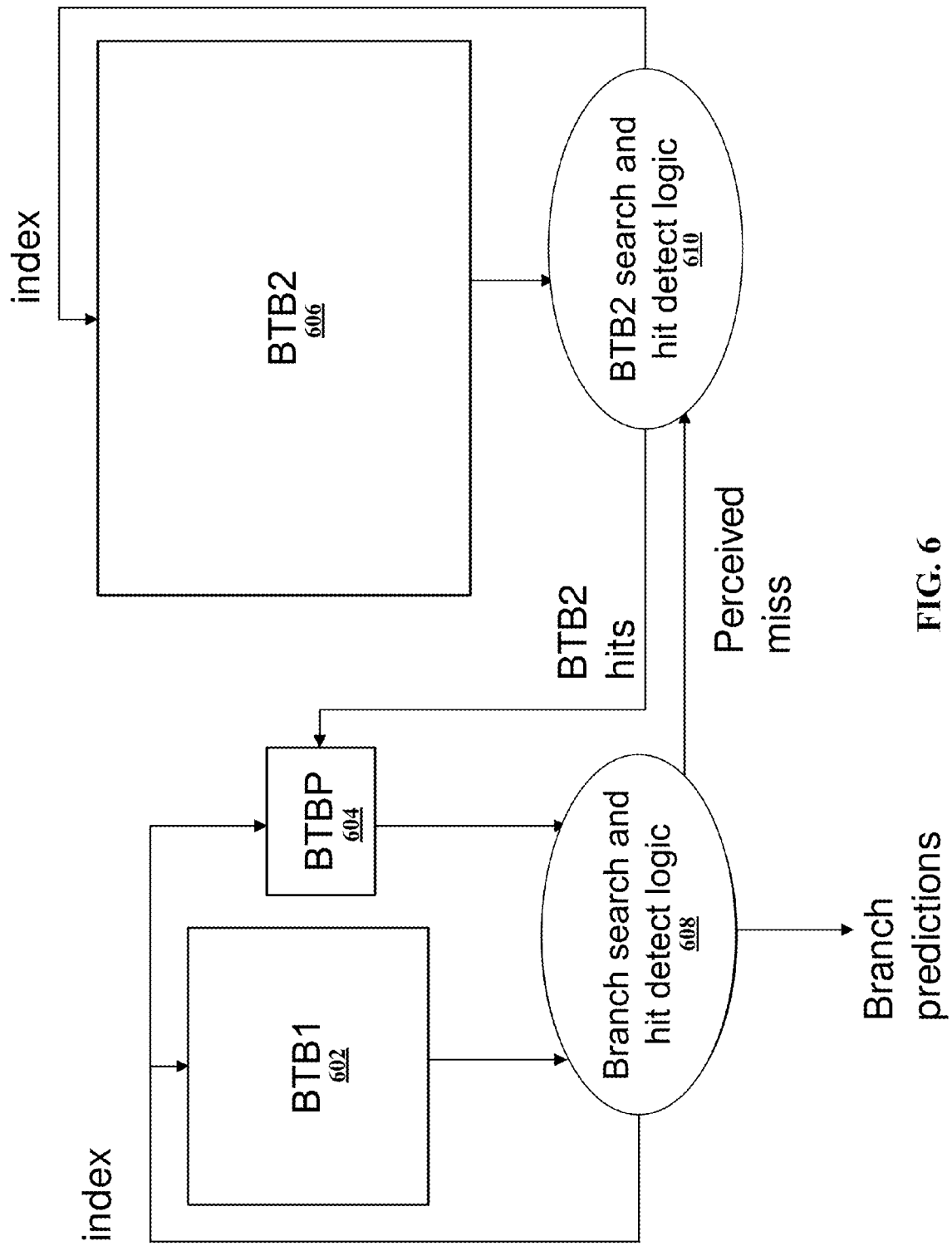
FIG. 6 depicts an example of a branch predictor, with a system flow diagram for a branch prediction hierarchy, according to embodiments of the present disclosure.

FIG. 6 depicts an example of a branch predictor, with a system flow diagram for a branch prediction hierarchy, according to embodiments of the present disclosure. A BTB structure can include multiple levels such as a first-level BTB (BTB1 602), a slower, but larger second-level BTB (BTB2 606) and an equally as fast or faster but smaller branch target buffer preload table (BTBP 604). Each BTB structure can be set associative, to include multiple sets of BTB entries.

The BTBP 604 is a small BTB that can be searched in parallel with a larger main BTB that can predict branch instructions' targets, and optionally direction. The BTB2 606 can be larger (and potentially slower) than the BTB1 602. Two level BTBs can support parallel lookups such that synchronous accesses of the first and second-level can be made to determine if BTB2 was successful in locating a matching entry if BTB1 602 was unsuccessful. Movement of branch prediction entries is managed between the BTB1, BTBP, and BTB2 to reduce duplicate entries between the BTB1 and BTB2. When an entry is copied from BTB2 to BTBP, it can be made least recently used (LRU) in the BTB2. Upon moving content from the BTBP to BTB1, the content that is evicted from BTB1 is written into the BTB2. The result is an exchange of BTB1 and BTB2 entries for some cases, depending on mapping of BTB2 congruence classes to BTB1 congruence classes.

The figure also depicts branch search and hit detect logic 608 and 610, which can detect and count the accesses, hits, and misses for each BTB structure. In an exemplary embodiment, a search address is used to access the branch predictor and predict a branch target address. When looking for branch predictions, both the BTB1 602 and BTBP 604 can be read. Either one can provide a branch prediction if it contains an entry with a branch address tag that matches the search address. The BTBP 604 and BTB1 602 can both provide input to branch search and hit detection logic 608 to determine whether a match or "hit" is located based on the search address. If a match is found, the branch search and hit detection logic 608 outputs a predicted target address. If the match was from the BTBP, a corresponding matching entry can be installed to the BTB1, such that the most recent and relevant branch target predictions are maintained in the BTB1 602. Thus, branches are directly predicted from the BTB1 and BTBP.

If at branch search and hit detect logic 608 associated with BTB1 602 and BTBP 604 a match is not found for a determined number of consecutive searches, a "miss" is perceived, and BTB2 search and hit detect logic 610 counts the search of the BTB2, and BTB2 606 can be searched and read for matching entries with a branch prediction address tag in the vicinity of the search address, for example in the same 4 KB region of code. BTB2 can provide input to BTB2 search and hit detect logic 610 to determine whether a hit was found in the BTB2 606. The BTB2 search and hit detect logic 610 communicates the BTB2 hits and the bulk transfer branch prediction information to the BTBP 604 (upon inferring a BTB1 and BTBP miss), which then outputs to the branch search and hit detect logic 608 the hit or miss. The hit or miss that is output by the branch search and hit detect logic 608 for each address is then output as branch predictions, as illustrated in FIG. 6.

Consistent with embodiments, the following table can illustrate a way in which branch prediction and outcome information can be translated to access, hit, and miss indications needed by SMT metering logic.

| prediction and outcome | report as BTB1 access | report as BTB1 hit | report as BTB2 access | report as BTB2 hit |
|---|---|---|---|---|
| surprise branch that belongs in the BTBs | yes | no | yes | no |
| dynamically predicted branch from the BTB1 | yes | yes | no | x |
| dynamically predicted branch from the BTBP | yes | no | yes | yes |

The rows along the top indicate the reporting options (outcomes) available to the system when reporting the branch predictions to the SMT metering logic. The column on the far left side indicates various branch predictions that can be output by the branch search and hit detect logic 608 (of FIG. 6). The second row indicates the various outcomes for a "surprise branch that belongs in the BTBs" prediction. A branch, as defined by instruction decode, that was not predicted from the BTB1 or BTBP is called a surprise branch. The direction of such a surprise branch can be guessed by some kind of static prediction mechanism (such as one based on decoding the instruction text, opcode and mask fields within the instruction itself). Surprise branches that qualify for being installed into the BTBs, such as ones that are statically guessed taken or resolved taken, are reported as BTB1 and BTB2 accesses and misses. The third row of the table indicates the various outcomes for a "dynamically predicted branch from the BTB1". A dynamically predicted branch from the BTB1 is reported as a BTB1 access and a BTB1 hit. It is not reported as a BTB2 access. An alternative implementation of this logic could report a dynamically predicted branch from the BTB1 as a BTB2 access and a BTB2 hit. The bottom row of the table indicates the various outcomes for a "dynamically predicted branch from the BTBP". A dynamically predicted branch from the BTBP is reported as a BTB1 access and a BTB1 miss. It is reported as a BTB2 access and a BTB2 hit.

A "yes" in the cells of "access" columns indicate an "access" will be reported to the SMT metering logic. A "no" in cells of "access" columns indicate that no "access" will be reported for that particular prediction. A "yes" in the cells of "hit" columns indicate a "hit" will be reported to the SMT metering logic, while a "no" indicates that a "miss" will be reported. The cell with "x (don't care)" indicates that the system is not concerned with this outcome, and no hit or miss will be reported, as a BTB2 access was not reported (and thus no hit or miss outcome is to be expected).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
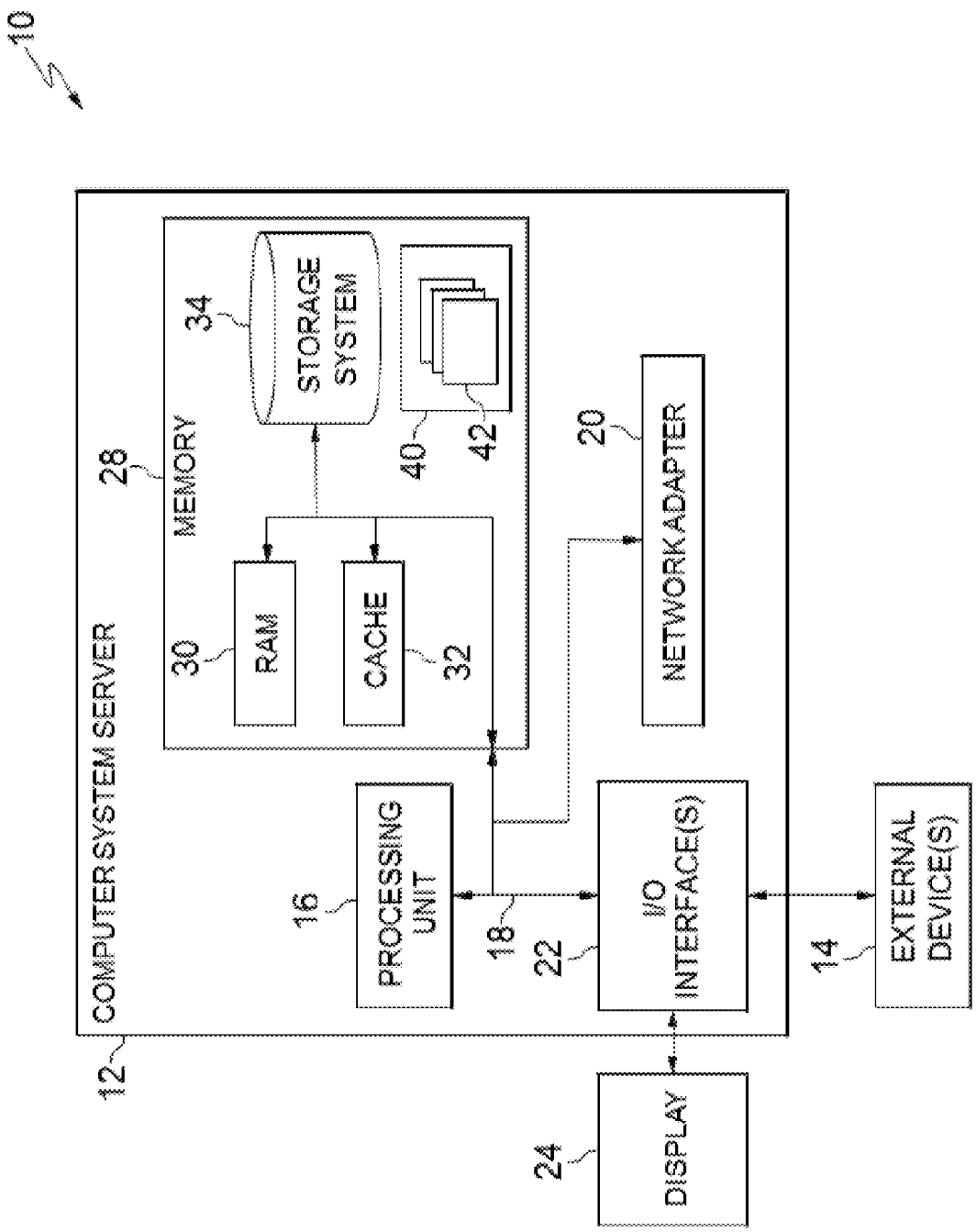
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
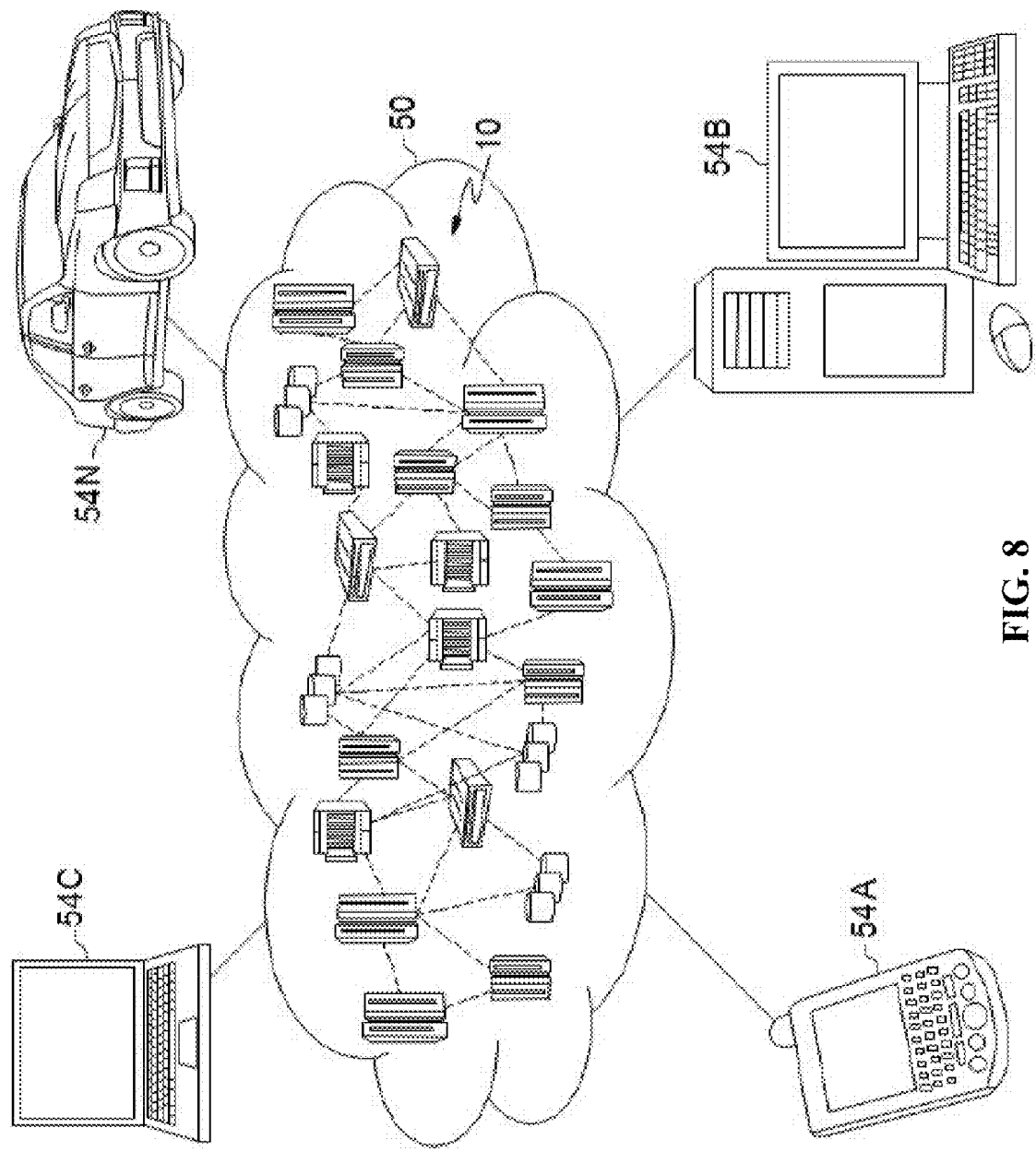
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
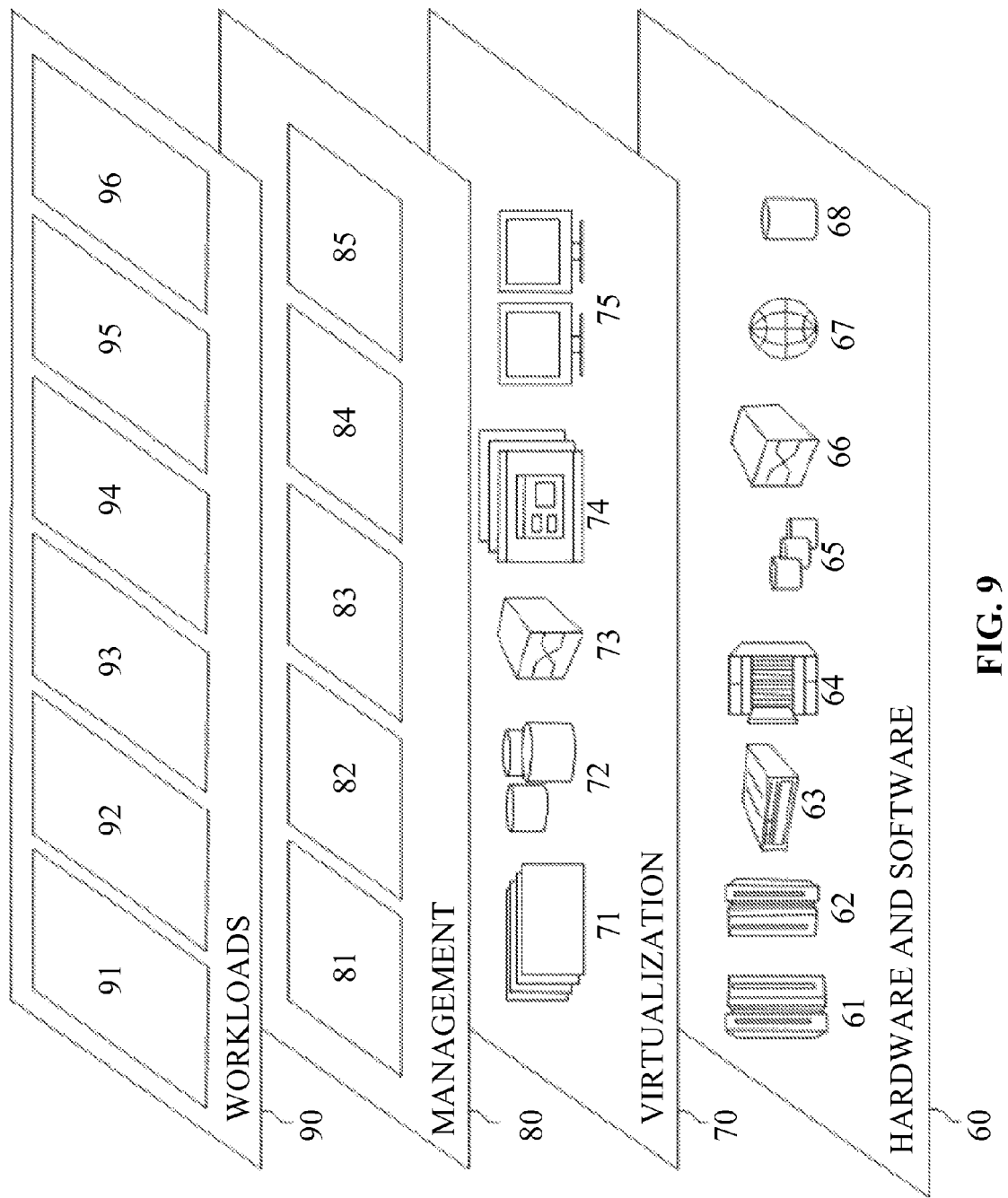
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating single-thread processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for assessing cache miss rates for a plurality of threads operating in a simultaneous multi-threading computer processor system, the system comprising:
    at least one shared cache and shared cache directory with a set of rows that are shared by the plurality of threads; and,
    at least one processor configured to:
        monitor, based upon use of the shared cache directory by the plurality of threads, first shared cache misses indicated by memory access requests to the shared cache directory;
        route the memory access requests to the shared cache directory to a plurality of metering cache directories that each contain a subset of rows from the set of rows, the routing based upon an association between each thread and a corresponding metering cache directory of the plurality of metering cache directories;

monitor, based upon memory access requests for the plurality of metering cache directories, first single thread cache misses for the memory access requests for the plurality of metering cache directories and for each thread of the plurality of threads;

determine a first sharing performance indication based upon the first shared cache misses and the first single thread cache misses;

modify at least one of the metering cache directories from the plurality of metering cache directories by changing the rows that are in the subset of rows; and determine a second sharing performance indication based upon second shared cache misses and second single thread cache misses that correspond to the modified rows in the subset of rows.

2. The system of claim 1, wherein the at least one processor configured to modify at least one of the metering cache directories from the plurality of metering cache directories is further configured to associate a different thread from the plurality of threads to the at least one of the metering cache directories.

3. The system of claim 1, wherein the plurality of metering cache directories further includes at least two metering cache directories that are associated with the same thread and wherein one of the at least two metering caches is not included in the first single thread cache misses.

4. The system of claim 1, wherein the at least one processor configured to modify at least one of the metering cache directories from the plurality of metering cache directories is further configured to use one of the at least two metering caches not included in the first single thread cache misses in the second single thread cache misses.

5. The system of claim 1, further comprising using another set of metering cache directories for another level of shared cache within the computer.

6. The system of claim 1, further comprising reporting branch target buffers (BTBs) accesses, hits, and misses to determine a sharing performance indication.

7. The system of claim 6, wherein the BTB accesses, hits, and misses are determined by:
identifying branch predictions for each thread;
identifying outcomes for each thread; and
translating, based on translating logic, the branch predictions and outcomes to accesses, hits, and misses.

8. A computer program product for assessing cache miss rates for a plurality of threads operating in a simultaneous multi-threading computer processor system having at least one shared cache and shared cache directory with a set of rows that are shared by the plurality of threads, the computer program product comprising a computer readable storage medium having program instructions embodied therewith, wherein the computer readable storage medium is not a transitory signal per se, the program instructions executable by a computer processing circuit to cause the circuit to perform the method comprising:

monitoring, based upon use of the shared cache directory by the plurality of threads, first shared cache misses indicated by memory access requests to the shared cache directory;

routing the memory access requests to the shared cache directory to a plurality of metering cache directories that each contain a subset of rows from the set of rows, the routing based upon an association between each thread and a corresponding metering cache directory of the plurality of metering cache directories;

monitoring, based upon memory access requests for the plurality of metering cache directories, first single thread cache misses for the memory access requests for the plurality of metering cache directories and for each thread of the plurality of threads;

determining a first sharing performance indication based upon the first shared cache misses and the first single thread cache misses;

modifying at least one of the metering cache directories from the plurality of metering cache directories by changing the rows that are in the subset of rows; and determining a second sharing performance indication based upon second shared cache misses and second single thread cache misses that correspond to the modified rows in the subset of rows.

9. The computer program product of claim 8, wherein modifying at least one of the metering cache directories from the plurality of metering cache directories further includes associating a different thread from the plurality of threads to the at least one of the metering cache directories.

10. The computer program product of claim 8, wherein the plurality of metering cache directories further includes at least two metering cache directories that are associated with the same thread and wherein one of the at least two metering caches is not included in the first single thread cache misses.

11. The computer program product of claim 8, wherein modifying at least one of the metering cache directories from the plurality of metering cache directories further includes using one of the at least two metering caches is not included in the first single thread cache misses in the second single thread cache misses.

12. The computer program product of claim 8, further comprising using another set of metering cache directories for another level of shared cache within the computer.

13. The computer program product of claim 8, further comprising reporting branch target buffers (BTBs) accesses, hits, and misses to determine a sharing performance indication.

* * * * *